United States Patent
Abel et al.

(10) Patent No.: US 8,726,132 B2
(45) Date of Patent: May 13, 2014

(54) CHECKSUM VERIFICATION ACCELERATOR

(75) Inventors: Francois Abel, Rüschlikon (CH);
Claude Basso, Nice (FR); Jean L. Calvignac, Raleigh, NC (US);
Natarajan Vaidhyanathan, Carrboro, NC (US); Fabrice Jean Verplanken, LaGaude (FR)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 13/302,688

(22) Filed: Nov. 22, 2011

(65) Prior Publication Data
US 2012/0151307 A1 Jun. 14, 2012

(30) Foreign Application Priority Data
Dec. 14, 2010 (EP) .................................. 10306409

(51) Int. Cl.
*H03M 13/00* (2006.01)
(52) U.S. Cl.
USPC .......................................................... 714/776
(58) Field of Classification Search
USPC .................................... 714/776, 4.1; 370/351
See application file for complete search history.

(56) References Cited

U.S. PATENT DOCUMENTS

| | | | |
|---|---|---|---|
| 6,530,061 B1 | 3/2003 | Labatte | |
| 7,502,474 B2 * | 3/2009 | Kaniz et al. | 380/255 |
| 7,594,002 B1 | 9/2009 | Thorpe et al. | |
| 7,617,438 B2 | 11/2009 | Brown et al. | |
| 7,656,894 B2 | 2/2010 | Dube et al. | |
| 7,782,905 B2 * | 8/2010 | Keels et al. | 370/474 |
| 2004/0218623 A1 * | 11/2004 | Goldenberg et al. | 370/463 |
| 2009/0097486 A1 * | 4/2009 | Carlini et al. | 370/392 |
| 2009/0327693 A1 | 12/2009 | Liang et al. | |
| 2010/0174770 A1 | 7/2010 | Pandya | |
| 2010/0235465 A1 | 9/2010 | Thorpe et al. | |

FOREIGN PATENT DOCUMENTS

WO   2010062679 A2   6/2010

OTHER PUBLICATIONS

Congdon, Paul; "Architecture for Hardware Hypervisor Network Offload"; pp. 1-23; Lecture Notes for ECS 201A Computer Architecture course at UC Davis; University of California Davis, Davis California (Sep. 2008).
Nimmelapelli, Raja; "FPGA Implementation of a SIP Message Processor"; pp. 1-129; Graduate Thesis submitted to North Carolina State University, Raleigh, North Carolina (2006).

* cited by examiner

*Primary Examiner* — Shelly A Chase
(74) *Attorney, Agent, or Firm* — Brevetto Law Group

(57) ABSTRACT

Disclosed is a method and system for validating a data packet by a network processor supporting a first network protocol and a second network protocol and utilizing shared hardware. The network processor receives a data packet; identifies a network packet protocol for the data packet; and processes the data packet according to the network packet protocol comprising: updating a first register with a first partial packet length specific to the first network protocol; updating a second register with a second partial packet length specific to the second network protocol; and updating a third register with a first checksum computed from fields independent of the network protocol. The system produces a second checksum utilizing a function that combines values from the first register, the second register, and the third register. The system validates the data packet by comparing the data packet checksum to the second checksum.

20 Claims, 4 Drawing Sheets

CHECKSUM VERIFICATION ACCELERATOR

CROSS-REFERENCE TO RELATED APPLICATIONS

This invention claims priority to the foreign application EP10306409.3 filed Dec. 14, 2010 in the European Patent office.

BACKGROUND

1. Field

The present invention relates to a method and system for verifying checksum fields that protect packets against transmission errors in a high-performance network processor

2. General Background

The main protocols protected by checksums are IPv4 at Layer 3 (IPv6 is not protected) and TCP and UDP at Layer 4. With the increased acceptance of IPv6, it is very common in current networks to exchange a mix of TCP or UDP segments transported onto IPv4 or IPv6 packets.

SUMMARY

A method and system for validating a data packet protected by a data packet checksum by a network processor supporting a first network protocol and a second network protocol utilizing shared hardware for either protocol is disclosed. The network processor receives a data packet; identifies a network packet protocol for the data packet; and processes the data packet according to the network packet protocol comprising: updating a first register with a first partial packet length specific to the first network protocol; updating a second register with a second partial packet length specific to the second network protocol; and updating a third register with a first checksum computed from fields independent of the network protocol. The system produces a second checksum utilizing a function that combines values from the first register, the second register, and the third register. The system validates the data packet by comparing the data packet checksum to the second checksum.

DRAWINGS

Embodiments of the present invention are described by way of example with reference to the accompanying drawings in which like references denote similar elements, and in which.

DETAILED DESCRIPTION

Embodiments of the invention are described below with reference to drawings in detail.

Traditionally, checksum verification has been a software task being part of the network stack of the operating system. When designing multiple-port high-performance network processors, it has become common to implement this function in hardware, in order to save processor cycles for packet processing and to provide added value.

Being a data path function, this type of hardware assist is typically implemented per port in a multiple-port network processor.

Although the underlying principle of checksum accumulation is fairly simple (16-bit one's complement sum), the implementation complexity of Layer 4 checksum is increased by the notion of pseudo-header which covers some fields of the IP Header, and since IPv4 and IPv6 Headers have different formats, the processing of pseudo-headers in a mixed protocol network implies more complex and thus larger hardware logic.

The problem is to minimize silicon area for checksum hardware offloads in a new Network Processor operating on multiple interfaces at 1 to 100 Gbps, including 10 Gbps.

An advantage of this aspect is that silicon area is minimized for a checksum accelerator comprised in a network processor able to process IPv4 and IPv6 packets.

Another advantage is that the checksum of an IPv4 header can be computed simultaneously with the checksum of a TCP/UPD segment over IPv4.

Further advantages of the present invention will become clear to the skilled person upon examination of the drawings and detailed description. It is intended that any additional advantages be incorporated therein.

Figure 1:
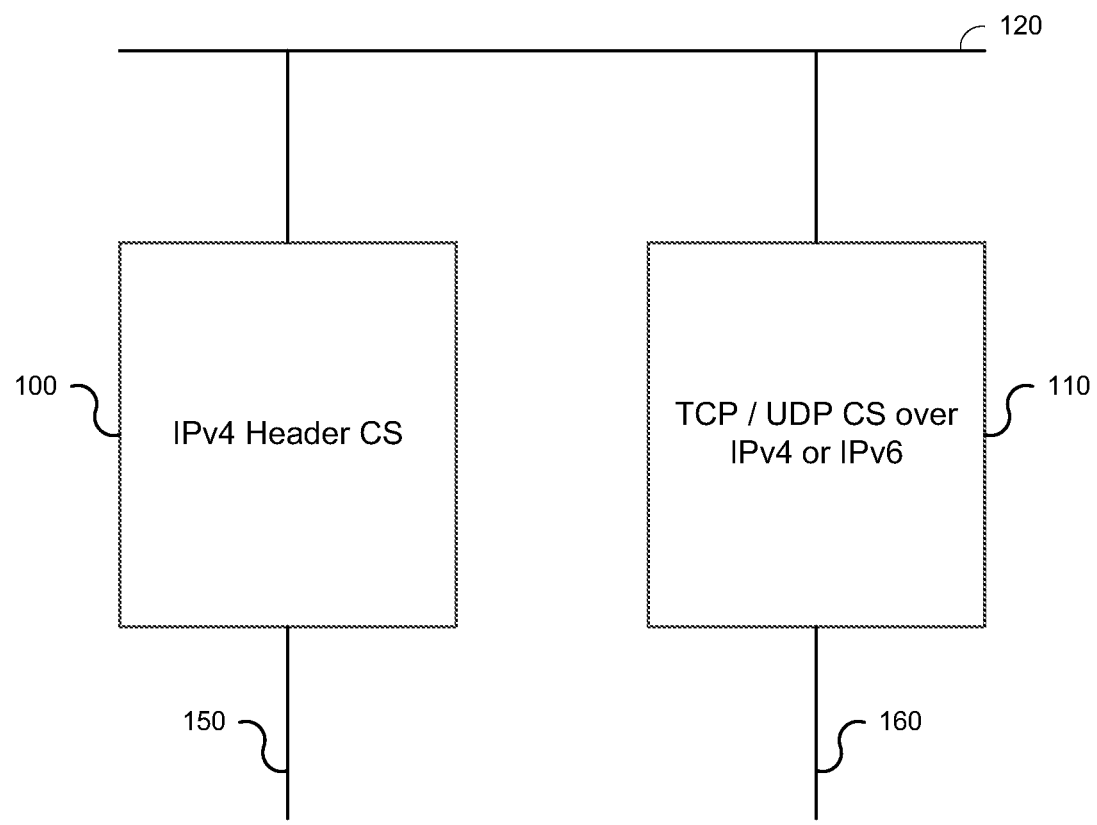
FIG. 1 shows a high level system view of an embodiment of the present invention.

FIG. 1 shows a high level system view of an embodiment of the present invention comprising: a component for computing the checksum of a IPv4 header (100); a component for computing the checksum of a TCP or UDP segment transported on an IPv4 or IPv6 packet (110); a data path (120) for sending the fields of a packet to the components (100, 110); the result of an IPv4 packet checksum (150); and the result of a TCP/UDP checksum (160).

Since some fields of the IPv4 header are covered by both the IPv4 checksum and the TCP/UDP checksum, a multicast path is provided to send these fields simultaneously as part of the data path (120). This aspect is described in more details regarding FIG. 4. Embodiments of the present invention for computing the checksum of an IPv4 header (100) are described in more details with respect to FIG. 3. Embodiments of the present invention for computing the checksum of a TCP or UDP segment (110) are described in more details regarding FIG. 2.

The system shown in FIG. 1 can be incorporated in a network processor which needs to compute the checksum of network packets it manages. Such network processor can be part of various network components, such as a network router or a network switch, connected to multiple interfaces, either wired or wireless, each interface being able to operate at various data rates, from 1 to 100 Gbps.

Figure 2:
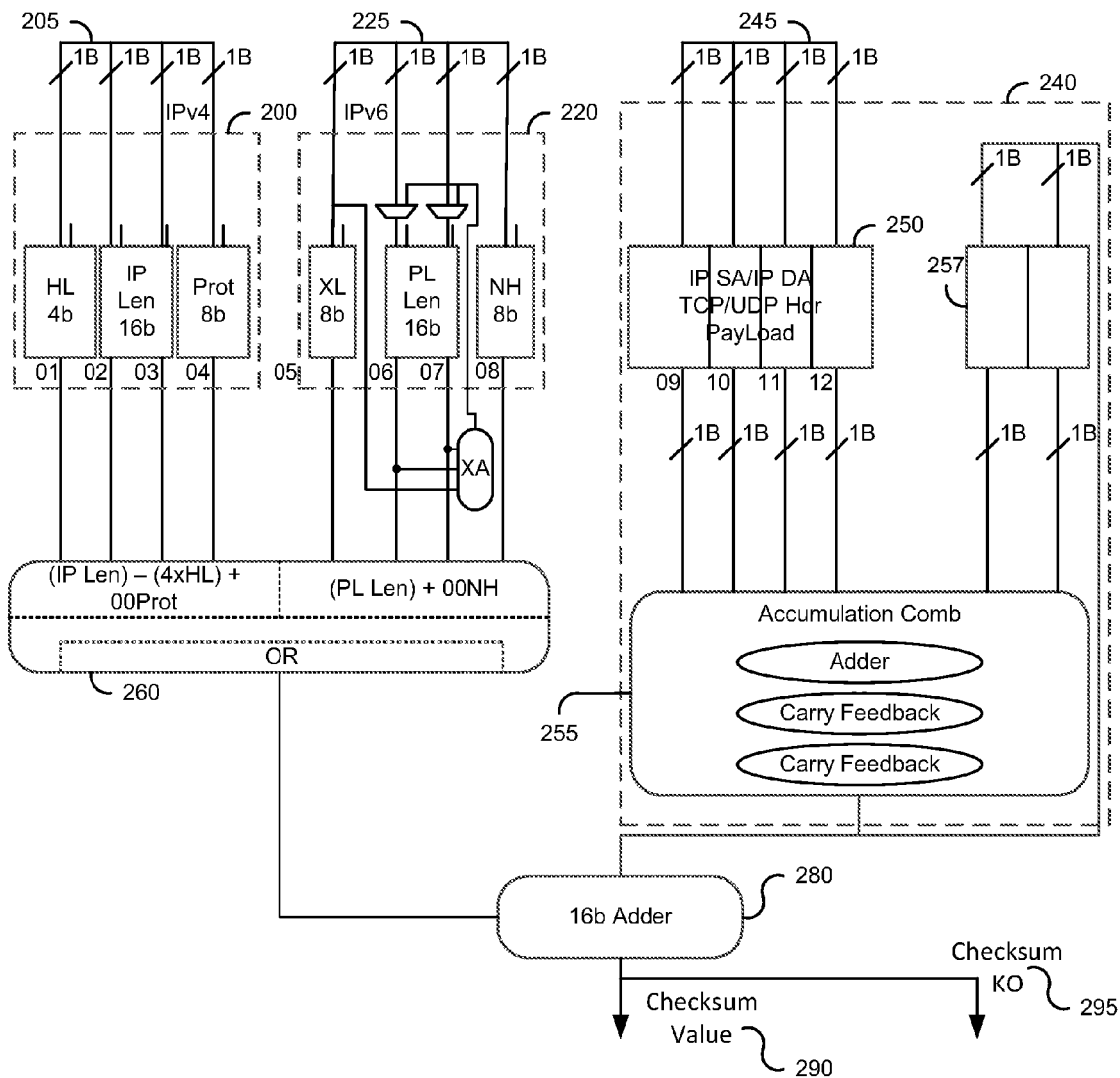
FIG. 2 shows a detailed view of a system for computing a TCP or UDP checksums in an embodiment of the present invention.

FIG. 2 shows a detailed view of a system for computing a checksum of a TCP or UDP segment comprising: a first logic block (200) for processing fields of a pseudo header which are specific to IPv4 headers, comprising a 4 bits register HL for storing the IPv4 header length, a 16 bits register IP Len for storing the total length of the IPv4 packet (header+payload), a 8 bits register Prot for storing the protocol field; a second logic block (220) for processing the fields of a pseudo header which are specific to IPv6 headers, comprising a 8 bits register XL for storing an extension length, a 16 bits register PL Len for storing the payload length of an IPv6 packet, a 8 bits register NH for storing the next header field; a third logic block (240) comprising a 4 bytes register (250) for processing the fields of a pseudo header which are common to IPv4 and IPv6 headers as well as the TCP/UDP headers and payloads.

Each piece of logic is sent by a packet parser, not represented in the drawings. In a preferred embodiment, the fields are of optimized sizes: 1 or 2 bytes for the fields sent to the first logic block (200) over wires (205), and for the fields sent to the second logic block (220) over wires (225); 4 bytes for the fields sent to the third logic block (240) over wires (245). Other sizes for each register can be implemented. The first logic block (200, 260) comprises the following equations implemented in hardware: TCP Length=IP Len−(4×HL) so as to remove IP Header Length from IP Total Length; Partial accumulation=TCP Length+(00 & Proto) so as to add 16b-padded Protocol to TCP Length. The second logic block (220, 260) comprises the following equations implemented in hardware: TCP Length=PL Len−((XL1+1)×8)− . . . −((XLN+1)×8) so as to remove all Header Extension Lengths (1 . . . N) from IP Payload Length; Partial accumulation=TCP Length+(00 & NH) so as to add 16-padded Protocol to TCP Length. Since IPv4 and IPv6 cases are exclusive, ORing, performed by the register (260), of the outputs of the first logic block (200) and of the second logic block (220) provides the generic partial accumulation. Furthermore the register (260) is used to store the results of the computation by the first (200) or second logic blocks (220) until the computation by the third logic block (240) is ready. Techniques to perform this are well known in the field.

In a preferred embodiment, the third logic block (240) comprises logic for processing the IP addresses, either IPv4 or IPv6 IP addresses, and for computing the TCP/UDP checksum. The first logic block (200) only processes the following fields: the header length, the protocol, and the IP length. The second logic block (220) only processes the following fields: payload length and the next header field. The exact signification of each field is well known. Furthermore, taking advantage of the property of IP addresses which are multiple of 4 bytes, 16-byte for IPv6 addresses and 4 bytes for IPv4 addresses, the third logic block (240) comprises in a preferred embodiment a 4 bytes input register (250) to which an IPv4 IP address is sent in one clock cycle and an IPv6 IP address is sent in 4 clock cycles. Reusing the same block for processing IPv4 and IPv6 addresses leads to great savings in silicon area. The typical solution is to process them as part of the pseudo headers and requires much more silicon area to be implemented.

The same input register is used for receiving the TCP or UDP header and data (also called payload). The 4 input bytes are accumulated onto a 16-bit accumulation comb (255) with one's complement adder. An accumulation register (257) is used to send the result of the accumulation of a cycle for the accumulation of the next cycle. The logic for implementing a one's complement adder is well known. Embodiments of the present invention should not be restricted to comprise only one's complement adders or to a particular implementation of an accumulator. 32 bits accumulators could be used instead. Any other logic for computing checksums can be implemented, without deviating from the teachings of the present invention. An important advantage of such an implementation is that it does not require the building of a mask to handle the various cases of TCP pseudo header. The implementation is flexible in the way it accumulates the fields sent to the various blocks. The final checksum result can be provided by computing the one's complement sum (280) of results from (first data block (200) output OR second data block (220)) and third data block (240). As a result the computed checksum value (290) and/or a comparison (295) to the expected checksum value is provided.

Figure 3:
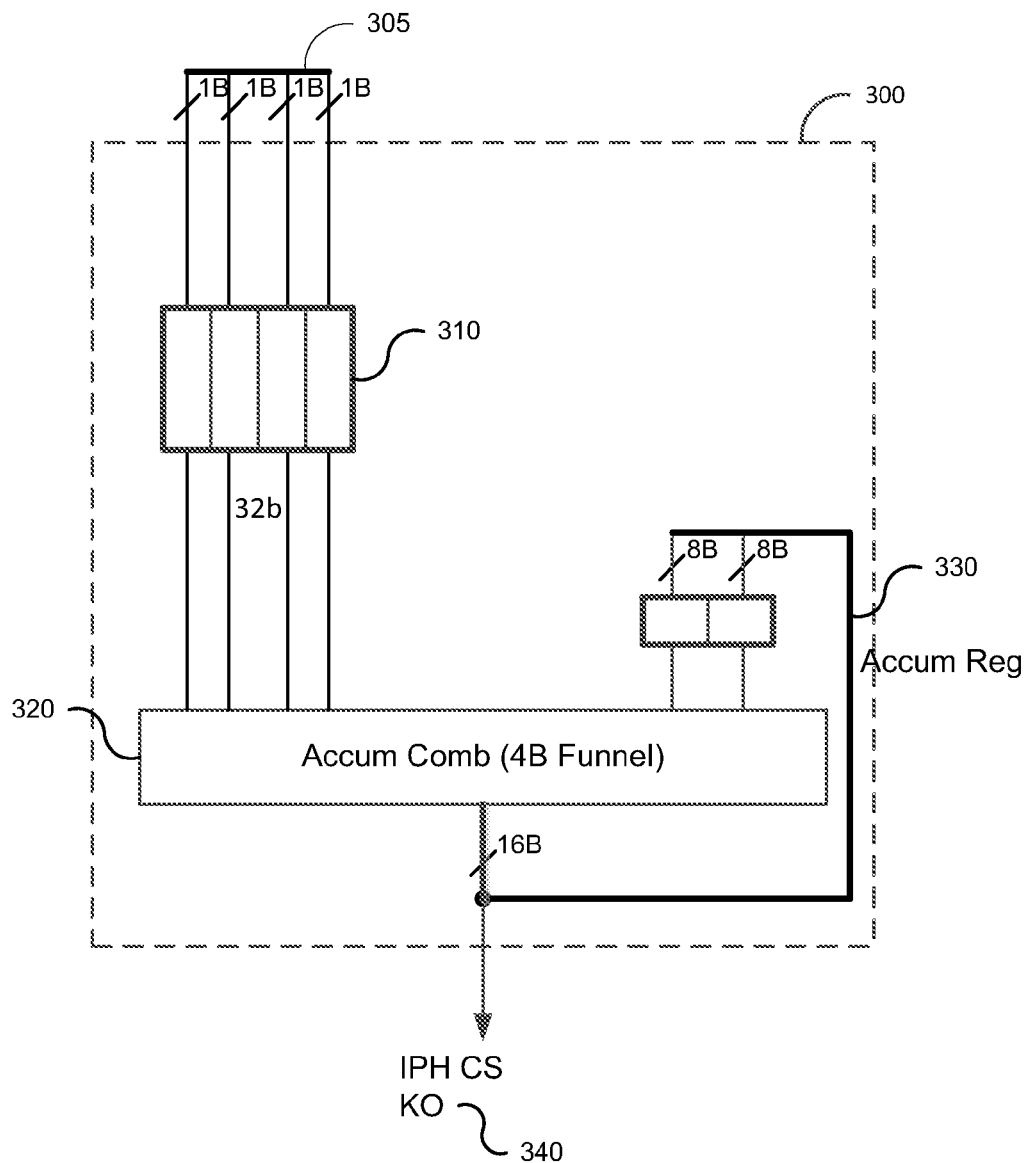
FIG. 3 shows a detailed view of a system for computing an IPv4 header checksum in an embodiment of the present invention.

FIG. 3 shows a detailed view of an example embodiment of a system for computing an IPv4 header checksum comprising: a fourth logic block (300) for computing the checksum of the IPv4 header of an IPv4 packet, sent by a 4 bytes data path (305). It comprises a 4 bytes input register (310), whose inputs are then accumulated with a one's complement adder in an accumulation comb (320) using a further accumulation register (330). A 4 bytes input register is preferred to take advantage of the fact that IPv4 headers are multiple of 4 bytes. The resulting computation indicates the checksum result, or an indication whether the computed checksum matches the expected checksum (340). For additional flexibility, the 4 bytes input register can allow partial filings of 1 or 2 bytes. In this case, transient registers can be used, so that they self reset to 00x after filing. Furthermore, reset signals are sent to the various registers. The sizes of the various registers could be altered based on the equation which is implemented in hardware and based on the size of the input variables. It is noted that any optimization performed for this fourth logic block (300) could be also implemented in the third logic block (240) described with respect to FIG. 2.

Figure 4:
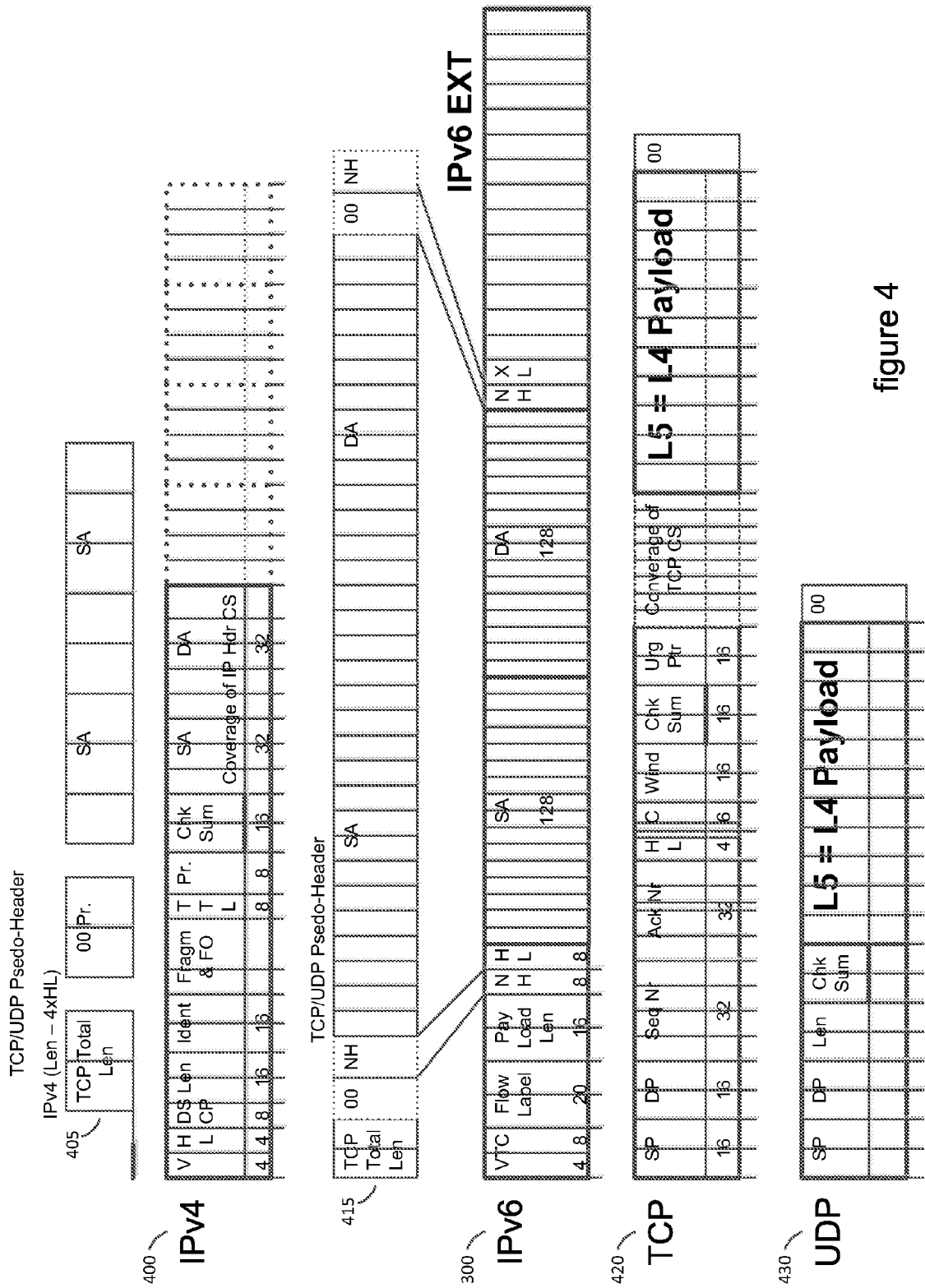
FIG. 4 shows the formats of IPv4 and IPv6 packets and of TCP and UDP segments which can be processed by embodiments of the present invention.

FIG. 4 shows the formats of IPv4 packet (400), an IPv6 packet (410), an IPv4 pseudo header (405), an IPv6 pseudo header (415), and of a TCP segment (420) and a UDP segment (430) which can be processed by an embodiment of the present invention. For an IPv4 packet header or pseudo header, as applicable, V represents the Version field; HL represents the Header Length field; DSCP represents the Differentiated Services Code Point field; Len is the Total Length field stored in the IP Len register shown in FIG. 2 in block (200); Ident is the Identification field; Fragm & FO represent the flags and fragment offset fields; Pr is the Protocol field; ChkSum is the checksum of the IPv4 header; SA represents the source address of the packet; DA represents the destination address. For an IPv6 packet header or pseudo header, as applicable, symbols have the same signification as for an IPv4 packet, except that they may be encoded over a different number of bytes or bits, as specified by the IPv6 specification, and except that HL (bits 56 to 63) represents the Hop Limit field. Furthermore TC represents the Traffic Class field. NH represents the Next Header field. The Payload Len field in FIG. 4 can be stored in the PL Len register shown in FIG. 2 in block (220). For a TCP segment, transported as part of either an IPv4 or an IPv6 packet, SP represents the Source Port, DP the Destination Port, Seq Nr the sequence number, Ack nr the Acknowledgment number, HL corresponds to the Data Offset field, C represents the control bits, Wind is the window size, ChkSum is the 16-bit checksum field used for error-checking of the header and data, Urg Ptr is the Urgent Pointer field. For a UDP segment, transported as part of either an IPv4 or an IPv6 packet, SP represents the Source Port, DP the Destination Port, Len is the total length of the header and data, and ChkSum is the checksum field. There are fields in common between the IPv4 pseudo header (405), used to compute a TCP/UDP checksum, and the IPv4 header (400) used to compute the IPv4 header checksum. To further minimize silicon area used by a checksum accelerator according to the invention, in a preferred embodiment of the present invention, a multicast path is provided to send these common fields simultaneously to the 2 logic blocks (200, 300). These common fields comprise the Header Length field (bits 4-7 of the IPv4 header), the Total Length field (bits 16-31 of the IPv4 header) and the Protocol field (bits 72-79 of the IPv4 header). As a consequence, it is possible to compute simultaneously the checksums of an IPv4 header and of TCP/UDP segment, thereby greatly increasing the processing efficiency of the checksum accelerator. Furthermore, doing so allows implementing two instances of logics for IPv4 and IPv6 headers so that the parser interface is simplified: no specific commands are sent by the parser, but only the specific header fields into dedicated input registers of the hardware accelerator. Silicon area optimization is complemented with the multicast sending which also brings performance optimization.

Another embodiment comprises computing the checksums of an IPv6 or IPv4 packet as required at levels 3 or 4 of the TCP/IP protocol, comprising first hardware logic means for computing a partial accumulation of the fields specific to the IPv4 or IPv6 pseudo header and second hardware logic means for computing a further partial accumulation of the fields common to IPv4 and IPv6 pseudo header, in particular the source and destination IP addresses, wherein these second hardware logic means are adapted for processing both IPv4 and IPv6 addresses using the same registers so as to save silicon area.

We claim:

1. A system configured to validate a data packet protected by a data packet checksum in a network processor supporting a first network protocol and a second network protocol utilizing
shared hardware for packets for either network protocol comprising:
a network processor;
a parser running on the network processor;
the parser configured to receive a data packet in a stream of data packets;
the parser configured to determine a network packet protocol for the data packet;
a first logic block with a first register for holding a first partial packet length;
a second logic block with a second register for holding a second partial packet length;
a third logic block with a third register for holding a first checksum computed from fields common to either network protocol;
the parser configured such that responsive to the parser identifying the network packet protocol as the first network protocol, to send a first set of fields extracted from the packet for adjusting length found in the first network protocol and not in the second network protocol and
the first logic block configured to update the first register with a first partial packet length;
the parser configured such that responsive to the parser identifying the network packet protocol as the second network protocol, to send a second set of fields extracted from the packet for adjusting length found in the second network protocol and not the first network protocol to a second logic block configured to update the second register with a second partial packet length;
the parser configured to send a third set of fields independent of the network protocol to a third logic block configured to update the third register with a first checksum;
a function configured to produce a second checksum by combining values from the first register, the second register, and the third register; and
the system configured to validate the data packet by comparing the data packet checksum to the second checksum.

2. The system of claim 1, wherein the network processor operates on at least two interfaces from 1 to 100 Gbps, including a 10 Gpbs interface.

3. The system of claim 1, wherein the network processor is a network router.

4. The system of claim 1, wherein the network processor is a network switch.

5. The system of claim 1, wherein the function comprises the one's complement sum resulting from an OR of the first register value and the second register value and the third register value.

6. The system of claim 1, wherein the first network protocol comprises an IPv4 protocol, the first set of fields comprises a TCP length and IPv4 header fields, and the first partial packet length comprises the TCP length with the header extension lengths removed.

7. The system of claim 1, wherein the second network protocol comprises an IPv6 protocol, the second set of fields comprises a TCP length and a plurality of header extension lengths, and the second partial packet length comprises the TCP length with each of the header lengths removed.

8. The system of claim 1, wherein the third set of fields comprises IP packet addresses and fields for computing a TCP/UDP checksum.

9. The system of claim 1, wherein the third logic block comprises an input register supporting a maximum size address and the time to load the register varies proportional to the size of the address.

10. The system of claim 1, further comprising:
a fourth logic block; and
responsive to the parser determining the network packet protocol having a first header checksum, the parser configured to send a fourth set of fields extracted from the packet to the fourth logic block configured to compute a second header checksum and to validate the data packet by comparing the first header checksum to the second header checksum.

11. The system of claim 10, wherein the network packet protocol comprises an IPv4 protocol.

12. The system of claim 10, further comprising: configured to send concurrently via a multicast path the fields used to compute both the first checksum and the second header checksum for the packet to the first logic block and the fourth logic block.

13. The system of claim 12, further comprising: configured to compute simultaneously the first checksum and the second header checksum.

14. A network processor configured to validate a plurality of data packets comprising first data packets of a first network protocol and second data packets of a second network protocol, the network processor comprising:
a first logic block configured to process fields of the first network protocol including header length data, total length data and protocol data of the first data packets;
a second logic block configured to process fields of the second network protocol including payload length data and next header field data of the second data packets; and
a third logic block configured to process IP addresses of the first data packets and IP addresses of the second data packets, and to compute a TCP/UDP segment checksum, wherein the IP addresses of the second data packets have more bits than the IP addresses of the first data packets.

15. The network processor of claim 14, wherein the first network protocol is IPv4 and the second network protocol is IPv 6 ; and
wherein the IP addresses of the first data packets have four bytes and the IP addresses of the second data packets have sixteen bytes.

16. The network processor of claim 15, further comprising:
an input register of the third logic block configured to receive each of the IP addresses of the first data packets in one clock cycle, the input register being further configured to receive each of the IP addresses of the second data packets in four clock cycles.

17. The network processor of claim 15, wherein the two or more IP address data fields comprise the header length data, the total length data and the protocol data of the first data packets, the network processor further comprising:
   a multicast path configured to provide two or more IP address data fields of the first data packets simultaneously to first logic block and to the third logic block.

18. The network processor of claim 15, wherein the third logic block comprises a 4-byte input register configured to receive each of the IP addresses of the first data packets in one clock cycle, the 4-byte input register being further configured to receive each of the IP addresses of the second data packets in four clock cycles.

19. The network processor of claim 15, wherein the third logic block is further configured to receive TCP or UDP header and payload data.

20. The network processor of claim 14, further comprising:
   a first input to the first logic block configured to receive the header length data of the first data packets;
   second and third inputs to the first logic block configured to receive the total length data of the first data packets, the total length being equal to payload length plus header length;
   a fourth input to the first logic block configured to receive the protocol data of the first data packets;
   a first input to the second logic block configured to receive an extension length data of the second data packets;
   second and third wires connected to the second logic block configured to receive the payload length data of the second data packets; and
   a fourth input to the second logic block configured to receive the next header field data of the second data packets.

* * * * *